Dec. 10, 1929.   J. M. LUERS   1,738,912
BLADE
Filed Jan. 21, 1928
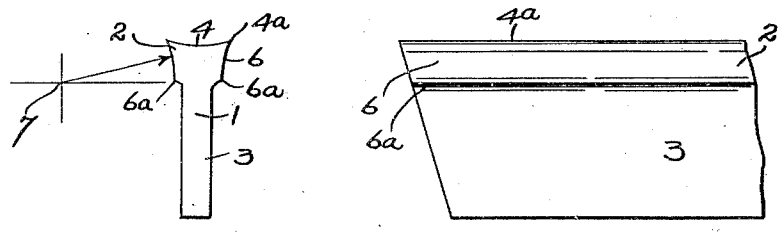
INVENTOR.
John. M. Luers.
BY
ATTORNEY.

Patented Dec. 10, 1929

1,738,912

UNITED STATES PATENT OFFICE

JOHN MILTON LUERS, OF DETROIT, MICHIGAN

BLADE

Application filed January 21, 1928. Serial No. 248,458.

This invention relates to improvements in blades, or cutters, intended for use in lathes, automatic machines, and the like. It is an object of the invention to provide a blade for such purposes as parting that will only require re-grinding at very infrequent intervals. Another object of the invention is to provide a blade so constructed that the work may be rotated with a minimum amount of power when cuts are being made, and wherein all tendency for the sides of the blade to bind against the cut sides of the work is eliminated even as the cutting edge becomes dull, or if the blade is set slightly out of alignment.

With these and other objects in view which will be mentioned as the specification proceeds, the invention is hereinafter more fully described with the aid of the accompanying drawings, in which:

Figure 1 illustrates a side elevation of the invention, and

Figure 2 is an end view thereof.

The blade 1 consists of a wider upper portion 2 and a narrower lower portion 3, the sides of which latter are preferably parallel with one another. The cutting surface 4 of the blade is hollow ground, or concave, and so shaped that its edges 4ª both project upwards a substantially equal amount. The sides 6 of the upper portion 2 are also hollow ground, or concave, but their concavities are preferably described from centres 7 horizontally on a plane with the lower ends of these concave portions, so that the lower edges 6ª of the sides 6 are nearer together than the upper edges of their sides which terminate at the edges 4ª of the cutting surface 4. Moreover, the length of the hollow ground sides 6 is usually substantially no greater than the width of the cutting surface 4, and frequently less than the width of the said cutting surface, so that the radii between the centres 7 and the sides 6 are sufficiently short to provide greater clearance immediately under the edges 4ª than would normally be obtained by tapering these sides unless they were tapered at an unusual and excessive angle which, if continued, would tend to weaken the whole blade.

The width of the lower portion 3 of the blade is preferably slightly less than the distance between the edges 6ª.

The purpose of hollow grinding the sides 6 is to provide clearance for the sides of the blade particularly when the edges of the cutting surface wear. In this way frictional contact between the sides of the cutter and the sides of the cut in the work is very materially lessened. Again if the blade is so set that it leans slightly to one side, as not infrequently happens, the side of the blade, when hollow ground, clears the work whereas a flat or wedge-shaped blade would bind.

Having thus described my invention what I desire to secure by Letters Patent is:

1. A blade having a wider and a narrower portion, said wider portion having a cutting edge across its outer margin and hollow ground sides which are wider apart at their outer ends, and the sides of said narrower portion being substantially parallel with one another and a lesser distance apart than any opposed portions of said hollow ground sides.

2. A blade having a wider and a narrower portion, said wider portion having a cutting surface across its outer margin and hollow ground sides, the centres from which said hollow ground sides are described being substantially on the same plane as the inner ends of said sides.

3. A blade having a wider and a narrower portion, said wider portion having a cutting surface across its outer margin and hollow ground sides, said sides being substantially no longer than the width of said cutting surface and further apart at their outer ends than at their ends adjacent to said narrower portion and said narrower portion being materially longer than said wider portion.

4. A blade having a wider and a narrower portion, said wider portion having a hollow ground outer surface one end of which forms a cutting surface, said wider portion having hollow ground sides widest apart at their outer ends, and the narrower portion having its sides nearer together than any opposed portions of said hollow ground sides.

5. A blade having a wider and a narrower portion, said wider portion having a hollow ground outer surface one end of which forms a cutting edge, said wider portion having hollow ground sides widest apart at their outer ends and substantially no longer than the width of said outer surface, and the narrower portion having its sides substantially parallel with one another and nearer together than any opposed portions of said hollow ground sides.

6. A blade for automatic machines formed with a relatively broad, thin shank and a cutting head, said cutting head having at least three hollow ground surfaces, two of which are opposite each other, and the base of the head next to the shank being of less over-all width than the over-all width of the opposite or cutting surface thereof.

JOHN MILTON LUERS.